United States Patent [19]
Okazaki et al.

[11] Patent Number: 5,745,220
[45] Date of Patent: Apr. 28, 1998

[54] IMAGE SELECTING APPARATUS FOR PHOTOGRAPHIC PRINTER

[75] Inventors: Hiroki Okazaki; Hironori Masutani; Junji Yamada, all of Wakayama, Japan

[73] Assignee: Noritsu Koki Co., Ltd., Wakayama, Japan

[21] Appl. No.: 591,089

[22] Filed: Jan. 25, 1996

[30] Foreign Application Priority Data

| | | | |
|---|---|---|---|
| Jan. 27, 1995 | [JP] | Japan | 7-011623 |
| Jan. 30, 1995 | [JP] | Japan | 7-012651 |
| Feb. 21, 1995 | [JP] | Japan | 7-032261 |
| Mar. 29, 1995 | [JP] | Japan | 7-071185 |

[51] Int. Cl.⁶ .................. G03B 27/44; G03B 27/52
[52] U.S. Cl. .................. 355/54; 355/40; 355/41
[58] Field of Search .................. 355/50, 40, 41, 355/42, 43, 54

[56] References Cited

U.S. PATENT DOCUMENTS

| | | | |
|---|---|---|---|
| 3,267,800 | 8/1966 | Baillod | 355/40 |
| 4,432,637 | 2/1984 | Baschung | 355/40 |
| 4,994,850 | 2/1991 | Imamura et al. | 355/41 |
| 5,369,463 | 11/1994 | Terashita et al. | 355/41 |
| 5,383,035 | 1/1995 | Suzuki | 355/40 |
| 5,428,422 | 6/1995 | Tanibata | 35/40 |
| 5,550,613 | 8/1996 | Hasegawa et al. | 355/41 |
| 5,592,258 | 1/1997 | Hashizume et al. | 355/41 |

FOREIGN PATENT DOCUMENTS

| | | |
|---|---|---|
| 308967 | 3/1989 | European Pat. Off. |
| 3642821 | 6/1987 | Germany |
| 1200348 | 8/1989 | Japan |

*Primary Examiner*—R. L. Moses
*Assistant Examiner*—Shival Virmanl
*Attorney, Agent, or Firm*—Felfe & Lynch

[57] ABSTRACT

An image frame selecting apparatus for a photographic printer includes a film receiving unit (30) defining a receiving surface (31) for receiving a photographic film (2), and a positioning indicator (35a) for positioning the photographic film on the receiving surface. The receiving surface is divided into a plurality of areas (31a) corresponding to image frames on the film. An input device (33, 34) selects an image frame to be printed, by designating at least one of the areas. The photographic printer has an image reading device for reading the image frames from the photographic film, a storage device for storing image information of the image frames read, an image processor for generating positive images of the image frames based on the image information stored in the storage device, and a monitor for displaying the positive images of the image frames. A control means unit (100) is provided for generating position data relative to the photographic film of the image frame selected.

17 Claims, 8 Drawing Sheets

Fig.10

REORDER CARD name _____ ~60

| NO | Number of Prints | | | | | | | | | | | |
|----|---|---|---|---|---|---|---|---|---|---|---|---|
| 00 | ⑩ | ⑳ | ㉚ | ① | ② | ③ | ④ | ⑤ | ⑥ | ⑦ | ⑧ | ⑨ |
| 0  | ⑩ | ⑳ | ㉚ | ① | ② | ③ | ④ | ⑤ | ⑥ | ⑦ | ⑧ | ⑨ |
| 1  | ⑩ | ⑳ | ㉚ | ① | ② | ③ | ④ | ⑤ | ⑥ | ⑦ | ⑧ | ⑨ |
| 2  | ⑩ | ⑳ | ㉚ | ① | ② | ③ | ④ | ⑤ | ⑥ | ⑦ | ⑧ | ⑨ |
| 3  | ⑩ | ⑳ | ㉚ | ① | ② | ③ | ④ | ⑤ | ⑥ | ⑦ | ⑧ | ⑨ |
| 4  | ⑩ | ⑳ | ㉚ | ① | ② | ③ | ④ | ⑤ | ⑥ | ⑦ | ⑧ | ⑨ |
| 5  | ⑩ | ⑳ | ㉚ | ① | ② | ③ | ④ | ⑤ | ⑥ | ⑦ | ⑧ | ⑨ |
| 6  | ⑩ | ⑳ | ㉚ | ① | ② | ③ | ④ | ⑤ | ⑥ | ⑦ | ⑧ | ⑨ |
| 7  | ⑩ | ⑳ | ㉚ | ① | ② | ③ | ④ | ⑤ | ⑥ | ⑦ | ⑧ | ⑨ |
| 8  | ⑩ | ⑳ | ㉚ | ① | ② | ③ | ④ | ⑤ | ⑥ | ⑦ | ⑧ | ⑨ |
| 9  | ⑩ | ⑳ | ㉚ | ① | ② | ③ | ④ | ⑤ | ⑥ | ⑦ | ⑧ | ⑨ |
| 10 | ⑩ | ⑳ | ㉚ | ① | ② | ③ | ④ | ⑤ | ⑥ | ⑦ | ⑧ | ⑨ |
| 11 | ⑩ | ⑳ | ㉚ | ① | ② | ③ | ④ | ⑤ | ⑥ | ⑦ | ⑧ | ⑨ |
| 12 | ⑩ | ⑳ | ㉚ | ① | ② | ③ | ④ | ⑤ | ⑥ | ⑦ | ⑧ | ⑨ |
| 13 | ⑩ | ⑳ | ㉚ | ① | ② | ③ | ④ | ⑤ | ⑥ | ⑦ | ⑧ | ⑨ |

| 26 | ⑩ | ⑳ | ㉚ | ① | ② | ③ | ④ | ⑤ | ⑥ | ⑦ | ⑧ | ⑨ |
|----|---|---|---|---|---|---|---|---|---|---|---|---|
| 27 | ⑩ | ⑳ | ㉚ | ① | ② | ③ | ④ | ⑤ | ⑥ | ⑦ | ⑧ | ⑨ |
| 28 | ⑩ | ⑳ | ㉚ | ① | ② | ③ | ④ | ⑤ | ⑥ | ⑦ | ⑧ | ⑨ |
| 29 | ⑩ | ⑳ | ㉚ | ① | ② | ③ | ④ | ⑤ | ⑥ | ⑦ | ⑧ | ⑨ |
| 30 | ⑩ | ⑳ | ㉚ | ① | ② | ③ | ④ | ⑤ | ⑥ | ⑦ | ⑧ | ⑨ |
| 31 | ⑩ | ⑳ | ㉚ | ① | ② | ③ | ④ | ⑤ | ⑥ | ⑦ | ⑧ | ⑨ |
| 32 | ⑩ | ⑳ | ㉚ | ① | ② | ③ | ④ | ⑤ | ⑥ | ⑦ | ⑧ | ⑨ |
| 33 | ⑩ | ⑳ | ㉚ | ① | ② | ③ | ④ | ⑤ | ⑥ | ⑦ | ⑧ | ⑨ |
| 34 | ⑩ | ⑳ | ㉚ | ① | ② | ③ | ④ | ⑤ | ⑥ | ⑦ | ⑧ | ⑨ |
| 35 | ⑩ | ⑳ | ㉚ | ① | ② | ③ | ④ | ⑤ | ⑥ | ⑦ | ⑧ | ⑨ |
| 36 | ⑩ | ⑳ | ㉚ | ① | ② | ③ | ④ | ⑤ | ⑥ | ⑦ | ⑧ | ⑨ |
| 37 | ⑩ | ⑳ | ㉚ | ① | ② | ③ | ④ | ⑤ | ⑥ | ⑦ | ⑧ | ⑨ |
| 38 | ⑩ | ⑳ | ㉚ | ① | ② | ③ | ④ | ⑤ | ⑥ | ⑦ | ⑧ | ⑨ |
| 39 | ⑩ | ⑳ | ㉚ | ① | ② | ③ | ④ | ⑤ | ⑥ | ⑦ | ⑧ | ⑨ |
| 40 | ⑩ | ⑳ | ㉚ | ① | ② | ③ | ④ | ⑤ | ⑥ | ⑦ | ⑧ | ⑨ |
| E  | ⑩ | ⑳ | ㉚ | ① | ② | ③ | ④ | ⑤ | ⑥ | ⑦ | ⑧ | ⑨ |

(Example)
For 5 prints of Frame No. 3

| 3 | ⑩ | ⑳ | ㉚ | ① | ② | ③ | ④ | ● | ⑥ | ⑦ | ⑧ | ⑨ |

For 12 prints of Frame No. 3

| 3 | ● | ⑳ | ㉚ | ① | ● | ③ | ④ | ⑤ | ⑥ | ⑦ | ⑧ | ⑨ |

IMAGE SELECTING APPARATUS FOR PHOTOGRAPHIC PRINTER

BACKGROUND OF THE INVENTION

1. Field of the Invention

The present invention relates to an image frame selecting apparatus for a photographic printer including an image frame selecting device for selecting an image frame to be printed from a photographic film having a plurality of image frames.

2. Description of the Related Art

A client may request additional prints to be made of images on a photographic film. An image frame selecting apparatus for a photographic printer as noted above is used for causing the photographic printer to recognize the frames designated by the client as containing the images to be printed.

It has been conventional practice, in causing the photographic printer to recognize the frames to be printed, to input frame numbers designated by the client as indicating the frames to be printed. The frames to be printed are identified by the numbers inputted and readings of frame numbers recorded in bar codes on the photographic film.

However, where the frames to be printed are identified by numbers, on not a few occasions does the operator input wrong numbers. This results in prints being made of frames different from those designated by the client.

U.S. Pat. No. 4,994,850 discloses an image frame selecting apparatus for a photographic printer for processing a short film piece having several image frames. This image frame selecting apparatus includes selection control devices corresponding in number to the frames on the film piece. A corresponding one of the selection control devices is operated to designate at least one image frame from the film piece conveyed into the photographic printer.

This image frame selecting apparatus designates desired image frames by means of the selection control devices arranged in relation to the film piece processed by the photographic printer. This arrangement realizes a more visual operation, which is likely to reduce the chance of making input errors, than where numerals are just inputted. However, this selecting apparatus does not allow the operator to designate desired image frames while visually confirming the image frames on the film piece in a direct manner. Thus, there are demands for an image frame selecting apparatus which realizes a more reliable image frame designation.

SUMMARY OF THE INVENTION

The object of the present invention is to provide an image frame selecting apparatus for enabling a selection of image frames accurately and easily, from a photographic film having a plurality of image frames to be printed by a photographic printer.

The above object is fulfilled, according to the present invention, by an image frame selecting apparatus comprising a film receiving unit including a receiving surface for receiving a photographic film, and a positioning indicator for positioning the photographic film on the receiving surface. The receiving surface is divided into a plurality of areas corresponding to image frames on the film. An image frame selecting device selects an image frame to be printed from the film by designating at least one of the plurality of areas.

With the image frame selecting apparatus having the above construction, a photographic film to be processed for additional prints is placed on the film receiving surface with reference to the positioning indicator. Then, the image frame selecting device is operated to select a desired image frame by designating one of the areas corresponding to that image frame.

In principle, a photographic film has frames arranged at fixed intervals. Thus, in processing the photographic film positioned on the film receiving surface with reference to the positioning indicator, the areas where the image frames of the photographic film are present may be regarded as positions of the image frames. The operator may confirm and designate a desired image frame, i.e. a desired area, while visually confirming the image frames of the photographic film placed on the receiving surface. In this way, the position of an image frame to be printed is determined, and this image information is used for a printing process by the photographic printer. An operation to select an image frame may be carried out accurately and easily since the image frames of the photographic film are confirmed visually.

In a preferred form of the present invention, the image frame selecting device includes markings formed in relation to the areas of the receiving surface, respectively, and an input device operable to select an image frame to be printed. In this case, each area may be selected by using the input device capable of inputting a signal corresponding to its marking. It is therefore possible for the input device to be incorporated into the photographic printer, for example, instead of the selecting apparatus. That is, the input device may be disposed adjacent the receiving surface or remote from the film receiving unit. This feature provides an increased freedom for positioning the input device without entailing an increased chance of making input errors.

In a further embodiment of the present invention, the input device is in the form of a plurality of input switches arranged in relation to the respective markings, thereby to provide a distinct relationship between the markings and the input device. Each of the markings and a corresponding one of the input switches have the same character or sign to establish a one-to-one relationship therebetween. Thus, a visual confirmation can be made of the relationship between the markings and the input device.

In a still further embodiment of the invention, the receiving surface includes frame boundary indicators corresponding to boundaries between the image frames on the photographic film set to the positioning indicator. Then, the operator may visually and clearly recognize the respective areas on the receiving surface formed in relation to the image frames on the photographic film. This feature promotes operability of the selecting apparatus.

To promote operability of the selecting device, the film receiving unit may advantageously include a lighting device such as a lamp for lighting the photographic film placed thereon. This provision facilitates observation of the image frames on the photographic film. That is, the film receiving unit may be used as a photographic film viewer.

The input device may be adapted to transmit a signal relating to the number of prints to be made of an image frame selected. Then, position information of the image frame to be printed and the number of prints may be communicated simultaneously to the photographic printer.

Where the photographic printer combined with the image frame selecting apparatus according to the present invention has an image reading device for reading image frames from a photographic film, a storage device for storing image information of the image frames read, an image processor for generating positive images of the image frames based on the image information stored in the storage device, and a monitor for displaying the positive images of the image frames, a control unit may be provided for generating position data relative to the photographic film of the image frame selected by the image frame selecting device. This construction enables linking between the image information of image frames already read and the position information of an image frame selected by the image frame selecting device. It is therefore possible to perform a printing process and a pre-printing process, as necessary, while checking, on the monitor, the image frame selected by the image frame selecting device.

In a preferred embodiment of the invention enabling a pre-printing process for the image frame selected by the image frame selecting device, additional data generated by the pre-printing process may be linked to the position data of the image frame. The pre-printing process here refers to trimming or a combination with other images. Such data may of course be stored in a portable storage medium to be passed on to the client for repeated use.

Where the image frame selecting apparatus is used with a printer capable of scanning image frames on a photographic film and allowing the operator to check the image frames appearing on a monitor as described above, the function as a viewer may be eliminated from the image frame selecting apparatus so that the apparatus may be used exclusively for designating image frames. That is, the function of the image frame selecting apparatus as a viewer is discarded in favor of the monitor function of the photographic printer.

In one form of the present invention, the position data relative to the photographic film of a selected image frame is generated as a place of the selected image frame in the order counted from an image frame at a leading end of the photographic film. Such position data generation is achieved with ease where the image frames on the photographic film are scanned beforehand and stored in order as image information in the storage device of the printer.

Other features and advantages of the invention will be apparent from the following description of preferred embodiments of the invention, as illustrated in the accompanying drawings.

BRIEF DESCRIPTION OF THE DRAWINGS

FIG. 10 is a view of an order card including a mark sheet.

DESCRIPTION OF THE PREFERRED EMBODIMENTS

A photographic printer to which the present invention is applied will be described with reference to the drawings.

Figure 1:
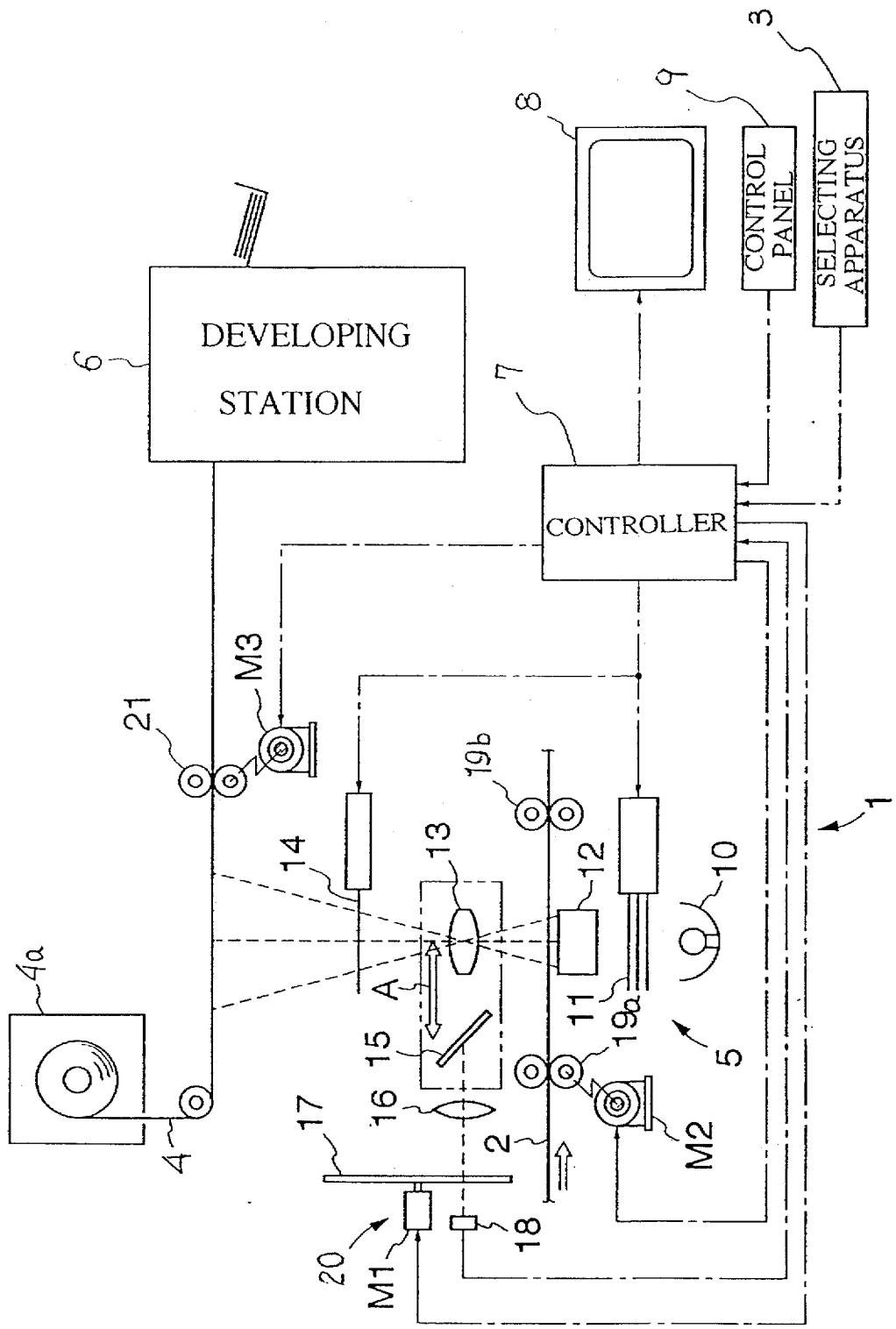
FIG. 1 is a schematic view of a photographic printer having an image frame selecting apparatus according to the present invention.

As shown in FIG. 1, a photographic printer 1 includes an exposure station 5 for projecting image frames of a photographic film 2 to printing paper 4, a developing station 6 for developing the printing paper 4 exposed at the exposure station 5, and a controller 7 for controlling operation of various components of the photographic printer 1. The controller 7 has, connected thereto, a control panel 9 for inputting various instructions and modes, a monitor 8 for displaying image information and exposure conditions, and an image frame selecting apparatus 3 for inputting instructions as to which image frames of the film 2 should be printed.

The printing paper 4 is drawn from a printing paper magazine 4a containing a roll of printing paper 4. After being exposed at the exposure station 5, the printing paper 4 is developed at the developing station 6, and cut to a size corresponding to one frame before being discharged.

The various components will be described hereinafter.

The exposure station 5 includes a light source 10, filters 11 for adjusting color balance of light which irradiates the film 2, a mirror barrel 12 for uniformly mixing colors of the light emerging from the adjusting filters 11, a printing lens 13 for projecting images of the film 2 to the printing paper 4, and a shutter 14, all arranged on a common optical axis forming an exposure optical path.

A reading device 20 is disposed sideways from the printing lens 13 for reading image information from the film 2. The reading device 20 includes a reflecting mirror 15, a lens 16, a rotary color filter 17 with R (red), G (green) and B (blue) color filters arranged in a circumferential direction, a motor M1 for driving the rotary color filter 17, and a CCD image sensor 18. The reading device 20 is operable under control of the controller 7.

The reflecting mirror 15 is mounted along with the printing lens 13 on a movable deck not shown. The movable deck supporting the printing lens 13 and reflecting mirror 15 is slidable in directions indicated by an arrow A in FIG. 1, to switch between a state in which the printing lens 13 is disposed on the exposure optical path, and a state in which the reflecting mirror 15 is disposed on the exposure optical path.

When the printing lens 13 is disposed on the exposure optical path, the image information on the film 2 is projected to the printing paper 4 by the printing lens 13. When the reflecting mirror 15 is disposed on the exposure optical path, the image information on the film 2 is reflected by the reflecting mirror 15, and then projected through the lens 16 to a light-receiving plane of CCD image sensor 18.

The CCD image sensor 18 scans the images on the film 2, in R, G and B color separations resulting from rotation of the rotary color filter 17. The image information thus detected is transmitted to the controller 7.

Rollers 19a are disposed on a film transport path upstream of the exposure optical path, while rollers 19b are disposed on the film transport path downstream of the exposure optical path. These rollers 19a and 19b are driven together by a motor M2.

When the reflecting mirror 15 is disposed on the exposure optical path, at the exposure station 5, the image information on the film 2 is read by CCD image sensor 18. When the printing lens 13 is disposed on the exposure optical path, the image information on the film 2 is exposed on the printing paper 4. The printing paper 4 is transported by rollers 21 driven by a motor M3 disposed on a paper transport path downstream of an exposure position of the printing paper 4.

Though not shown, the developing station 6 includes a plurality of tanks filled with treating liquids for developing the printing paper 4 after exposure. The printing paper 4 is passed successively through these tanks to be developed.

Figure 2:
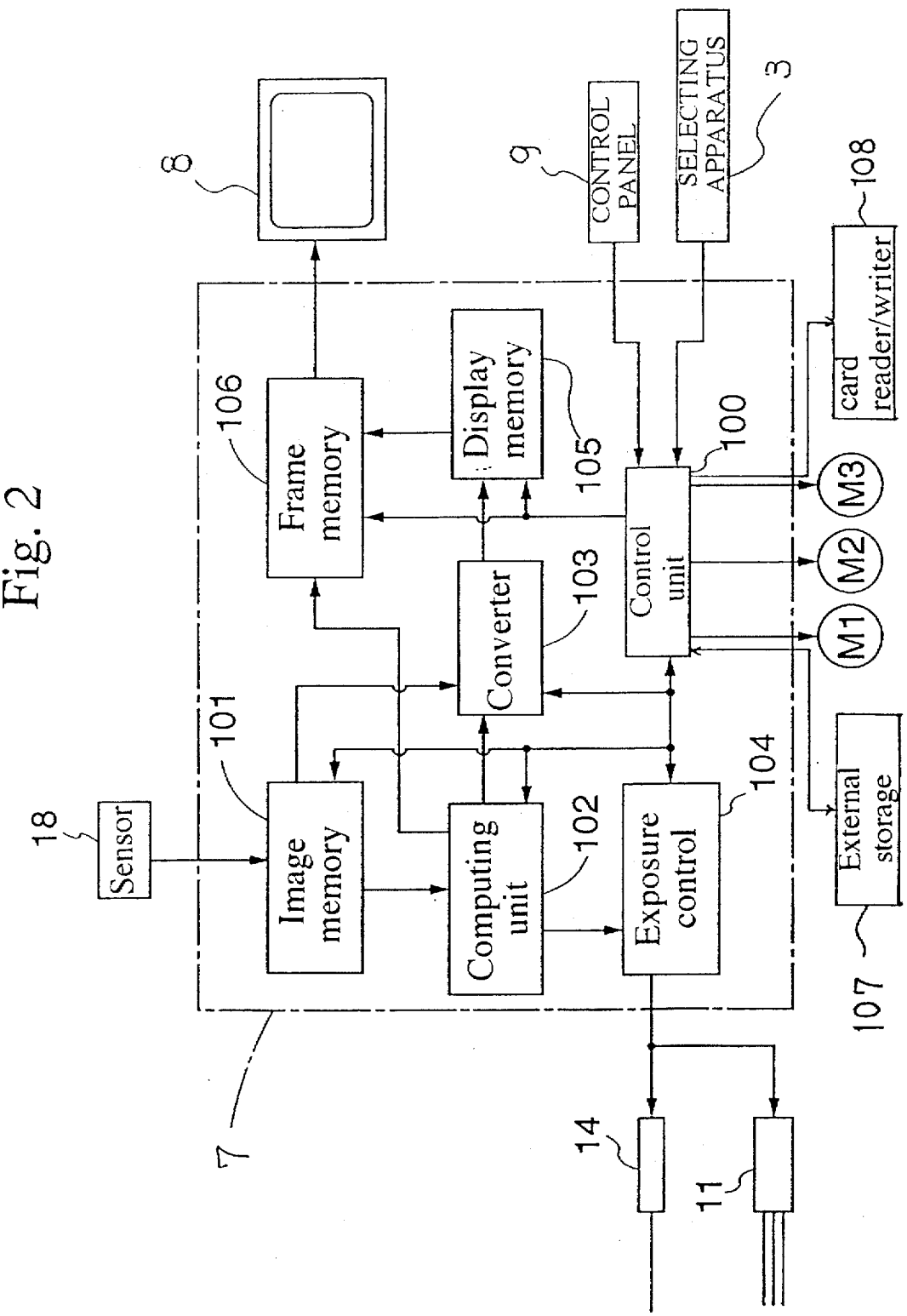
FIG. 2 is a block diagram of a controller of the photographic printer shown in FIG. 1.

As shown in FIG. 2, the controller 7 includes an image information memory 101 for storing the image information read by CCD image sensor 18, an exposure condition computing unit 102 for reading the image information from the image information memory 101 and determining exposure conditions for exposing the image information on the printing paper 4, an exposure control unit 104 for controlling the adjusting filters 11 and shutter 14 at the exposure station 5 based on the exposure conditions determined by the exposure condition computing unit 102 to effect exposure on the printing paper 4, an image information converter 103 for converting the image information read from the image information memory 101 to image information for display on the monitor 8 based on the exposure conditions determined by the exposure condition computing unit 102, an image display memory 105 for storing the image information received from the image information converter 103, a display frame memory 106 for storing information to be displayed in one screen frame on the monitor 8, and a control unit 100 for instructing operation of these components.

The image information memory 101 has a storage capacity for storing image information corresponding to a plurality of image frames on the film 2 read by the CCD image sensor 18. In this embodiment, the image information memory 101 has a sufficient storage capacity for storing image information from all the image frames on one film 2. The image information converter 103 may read the image information corresponding to a plurality of frames from the image information memory 101 and convert this image information. Consequently, the image information corresponding to the plurality of frames may be displayed simultaneously on the monitor 8.

When the image information corresponding to all the image frames on one film 2 is accumulated in the image information memory 101, the exposure condition computing unit 102, prior to determining exposure conditions for each frame, divides each frame on one film 2 into numerous regions, and statistically averages densities of R (red), G (green) and B (blue) in all of the divided regions on one film 2. In this way, the exposure condition computing unit 102 extracts film characteristics unique to the film 2, which indicate how the film 2 expresses color according to the quantity of light received from photographic subjects.

In determining exposure conditions for each image frame on the film 2, the exposure condition computing unit 102 first determines coloring characteristics corresponding to each image frame, based on the film characteristics unique to the film 2, from an average density of each image frame, i.e. an average quantity of light transmitted from a photographic subject to each image frame.

The exposure condition computing unit 102 stores operation expressions for canceling the coloring characteristics unique to the film 2 including a base color thereof, and determining exposure conditions for properly reproducing the image information of the film 2 on the printing paper 4. These operation expressions are used to determine exposure conditions from the coloring characteristics corresponding to each frame determined as described above.

The exposure conditions thus determined may be corrected by the operator operating density correction keys provided on the control panel 9. These correction keys are operable to instruct variations in the amount of exposure for each of colors Y (yellow), M (magenta) and C (cyan), or average variations in the amount of exposure corresponding to density variations in the photographs. Upon receipt of these corrective instructions, the exposure condition computing unit 102 performs a corrective computation of the exposure conditions to determine new exposure conditions.

The image information converter 103 stores an operation expression for converting the image information read from the image information memory 101 such as for negative-to-positive conversion. Various parameters constituting the operation expression are variable according to the exposure conditions determined by the exposure condition computing unit 102.

The image information inputted to the image information converter 103 is converted with the above operation expression to simulate color images formed on the printing paper 4 by projecting the image frames of film 2 to the printing paper 4, so that images corresponding to the simulated images appear on the monitor 8.

The image information converted by the image information converter 103 is stored in the image display memory 105. The image display memory 105 has a storage capacity corresponding to that of the image information memory 101, and stores the simulated images for one film 2 in the order in which the frames are arranged.

The display frame memory 106 stores information for one screen frame displayed on the monitor 8. The display frame memory 106 has storage regions in a one-to-one relationship with display positions on the monitor 8, so that the information written into the display frame memory 106 is displayed intact on the monitor 8.

Figure 3:
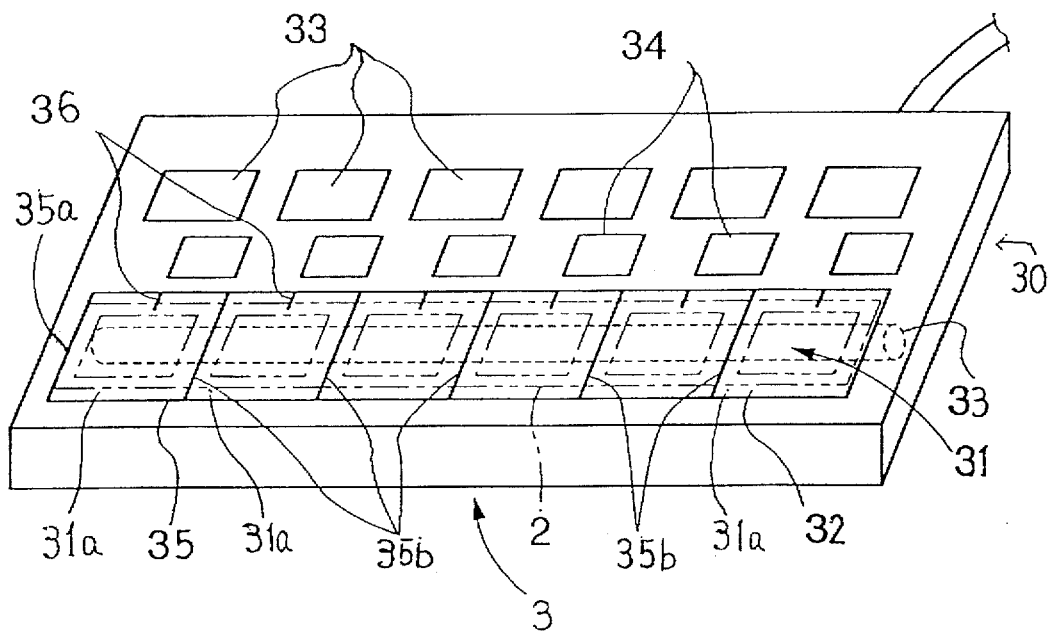
FIG. 3 is a perspective view of an image frame selecting apparatus in one embodiment of the present invention.

As shown in FIG. 3, the image frame selecting apparatus 3 connected to the controller 7 includes a film receiving unit 30 defining a film receiving surface 31 for receiving film 2 cut to include six frames, and an image frame selecting device for selecting image frames from the film 2 placed on the film receiving surface 31. The film receiving surface 31 is divided into a plurality of areas 31a corresponding to the image frames on the film 2. The image frame selecting device includes six input keys 33 for designating the divided areas 31a, and six auxiliary input keys 34 for designating half-size frames. Tese keys 33 and 34 constitute an input device.

In this embodiment, the film receiving surface 31 is defined by a light diffuser plate 32. A fluorescent lamp 33 is disposed inside a box and opposed to the light diffuser plate 32 for lighting the film 2. Thus, the film receiving unit 30 acts as a so-called viewer for facilitating a visual observation of the image frames on the film 2 placed thereon.

The light diffuser plate 31 has frames 35 marked thereon corresponding to the six 135-size, full-size frames on the film 2. An auxiliary frame 36 corresponding to a half-size frame is marked substantially centrally of each frame 35. These frames 35 act as markings corresponding to the areas 31a defined on the film receiving surface 31.

When placing the film 3 on the film receiving surface 31, the left end of the film 2 is set to a vertical line 35a at the left end of the frames 35 acting as a positioning mark. While, in this embodiment, positioning is effected at the left end of the film 2, the construction may be modified, as necessary, to effect positioning at the right end of the film 2.

Vertical lines 35b other than the vertical line 35a at the left end of the frames 35, and auxiliary frames 36, act as markings corresponding to boundaries of the image frames on the film 2 placed properly as described above.

As shown in FIG. 2, an external storage device 107 is connected to the controller 7 for writing into portable storage media such as floppy disks, position information relating to selected image frames on the film 2, and information relating to printing and other additional processes for such image frames.

An outline of operation of the above photographic printer 1 will be described next.

The operator places the film 6 cut to a unit of six frames including a frame or frames to be printed at the client's request, on the film receiving surface 31 of the image frame selecting apparatus 3. At this time, the left end of the film 2 is set to the vertical line 35a at the left end of the frames 35.

Figure 5:
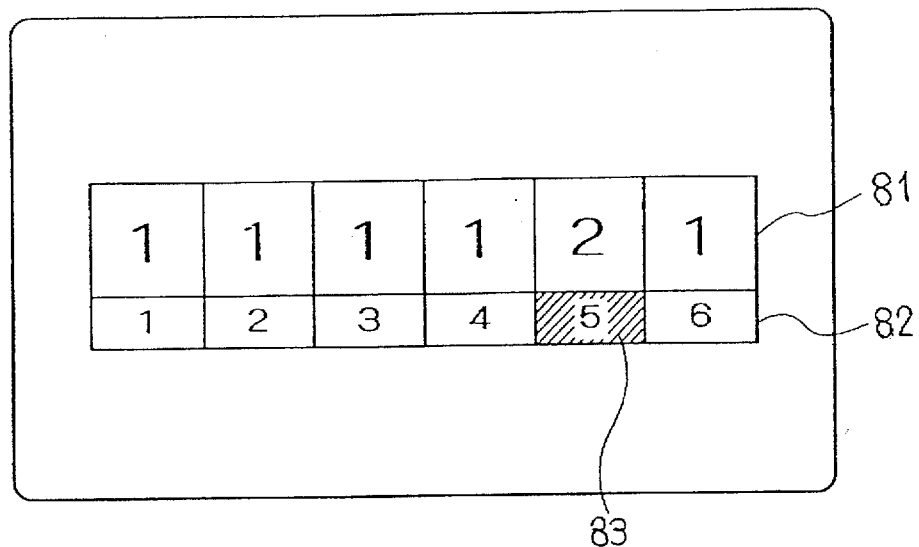
FIG. 5 is a view of images displayed on a monitor.

In this embodiment, as shown in FIG. 5, the monitor 8 displays, on its screen, number of prints columns 81 and cursor columns 82 arranged vertically with respect to each other, and horizontally to correspond to the arrangement of the six frames on the film 2, i.e. the arrangement of areas 31a on the film receiving surface 31. The operator visually confirms the position of a frame designated by the client, and presses one of the input keys 33 corresponding to that frame. Then, a cursor 83 is displayed in one of the cursor columns 82 corresponding to the input key 33 pressed, and at the same time "1" is shown in the number of prints column 81 corresponding to that frame.

When the film 2 has half-size frames, two frames arranged sideways correspond to one input key 33. For designating the left one of the two half-size image frames, only the input key 33 is pressed. For designating the right one of the two half-size image frames, the operator presses the input key 33 while pressing a corresponding one of the auxiliary input keys 34. When a half-size frame is designated in this way, the monitor 8 switches the number of prints columns shown in FIG. 5 from full-size to half-size, that is, each column being divided into two parts.

Figure 4:
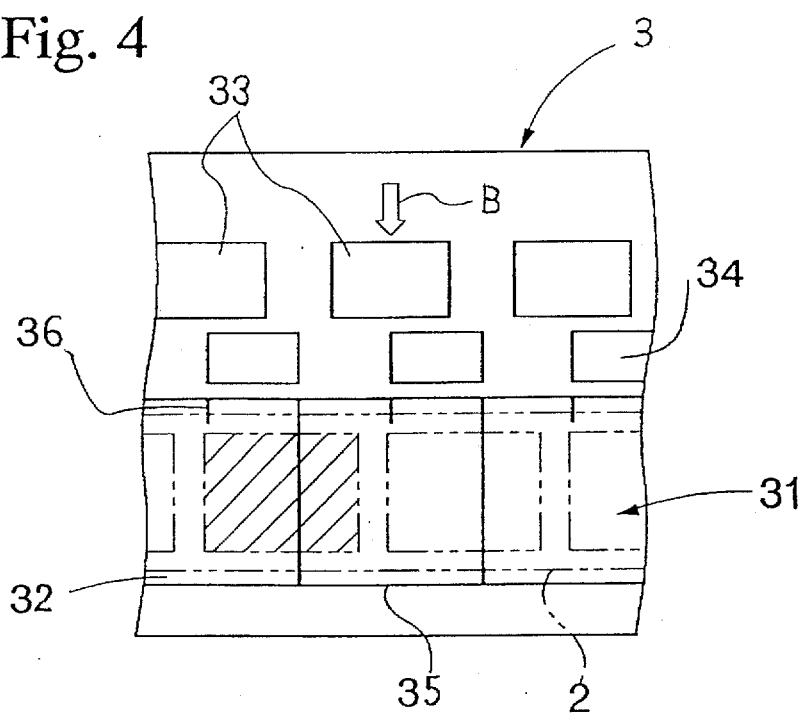
FIG. 4 is an enlarged fragmentary view illustrating use of the image frame selecting apparatus shown in FIG. 3.

There occurs no problem in designating frames to be printed, when each frame on the film 2 fits in one of the areas 31a or frames 35. However, as shown in FIG. 4, two image frames can partly enter one area 31a or frame 35. In such a case, an input key 33 is pressed by regarding each frame as fitting in the right frame 35. That is, in FIG. 4, an input key 33 indicated by an arrow B is pressed for a hatched frame.

The number of prints to be made of an image frame may be determined by the number of times an input key 33 or auxiliary input key 34 is pressed. The number of prints column 81 corresponding to that image frame shows a numeral variable accordingly. Thus, the number of prints may be inputted through the input keys 33 and auxiliary input keys 34. Information on the designated frames to be printed and the numbers of prints is transmitted to the control unit 100 of the controller 7 to be linked by a known method. After completing operation of the image frame selecting apparatus 3 to designate frames to be printed, the operator loads the film 2 into a main body of the photographic printer 1 for a printing process.

The photographic printer 1 has three modes, i.e. an auto print mode, a prejudge print mode and a manual print mode, which provide different ways of setting exposure conditions for each frame.

In the auto print mode, the image frames are read from the film 2 by the reading device 20, exposure conditions are automatically determined for these image frames based on the information read, and the frames are printed automatically. In principle, the operator does not have to do anything after loading the film 2.

In the prejudge print mode, the image frames are read from the film 2 by the reading device 20, and exposure conditions are automatically determined for these image frames based on the information read. However, instead of printing the frames automatically, simulated images are displayed on the monitor 8 to show the image frames to be printed on the printing paper 4 on the exposure conditions determined. Then, the operator may correct the exposure conditions as necessary.

In the manual print mode, exposure conditions are not determined automatically, but the operator visually observes density levels of the image frames on the film 2 to determine exposure conditions empirically. In the manual print mode, the operator places the film 2 on the film receiving surface 31 of the image frame selecting apparatus 3 to select frames to be printed, and inputs exposure conditions for the selected frames through the control panel 9.

In the auto print mode and manual print mode, all processes, in principle, are carried out automatically after the film 2 is loaded. Thus, only the prejudge mode will be described hereinafter. Positioning of the film 2 and other such steps are effected in the same way for all the print modes.

Figure 6:
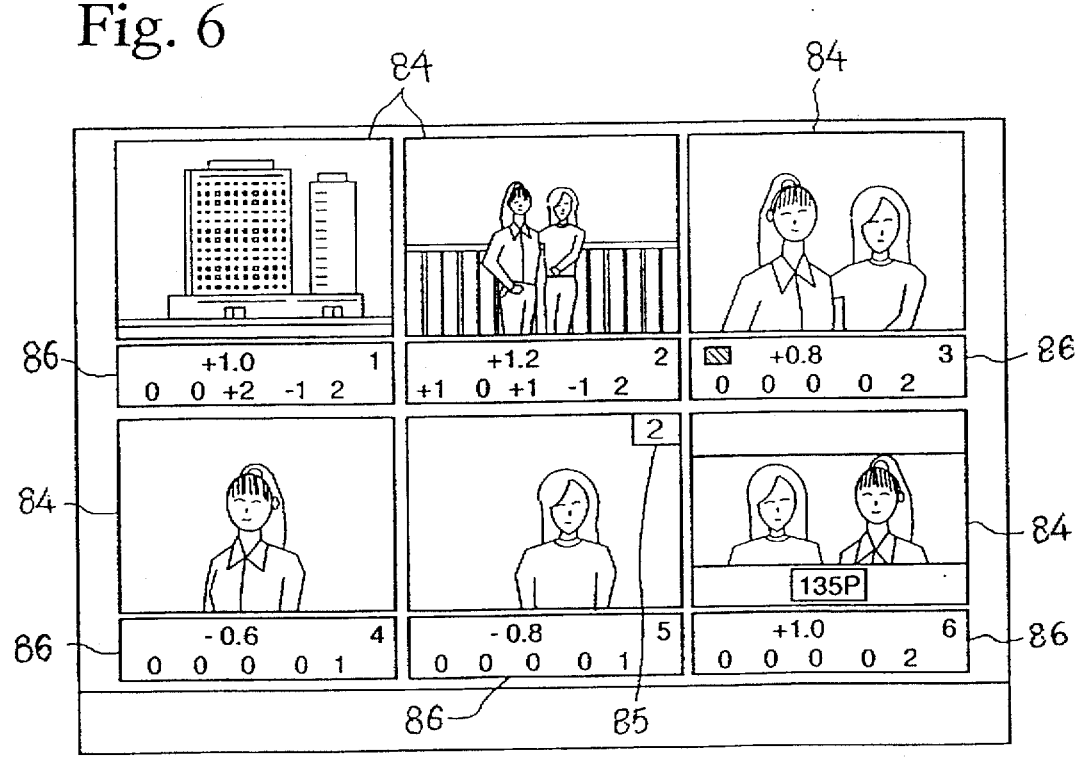
FIG. 6 is a view of other images displayed on a monitor.

The reading device 20 reads the image frames from the film 2 loaded. After the reading, as shown in FIG. 6, image information of image frames selected for printing is displayed as simulated images. In the example shown in FIG. 6, all of the six frames are selected for printing.

The controller 7 identifies image information of the image frames selected for printing, based on information on the order of arrangement of the frames received from the image frame selecting apparatus 3, and storage positions and the like of the image frames scanned.

The display on the monitor 8 shown in FIG. 6 includes image columns 84 presenting the simulated images of the frames to be printed. These image columns 84 include number of prints columns 85 for indicating the numbers of prints to be made of the respective frames. Thus, the operator may correct the numbers of prints, as necessary, through the image frame selecting apparatus 3 or control panel 9. Where a large number of prints are to be made, the number may be designated by means of a numerical input through the control panel 9. The numbers of prints may all be inputted through the control panel 9 instead of using the image frame selecting apparatus 3. Thus, the control panel 9 acts also as an input device of the image frame selecting apparatus 3 as do the input keys 33.

Further, the display on the monitor 8 includes exposure condition columns 86 for displaying the exposure conditions determined by the exposure condition computing unit 102 based on the information read by the reading device 20. This display is variable with inputs the operator makes through the control panel 9 for correcting the exposure conditions. Upon completion of the above operation, the image frames selected for printing are successively moved onto the exposure optical path, whereby the image frames are printed on the printing paper 4.

Figure 7:
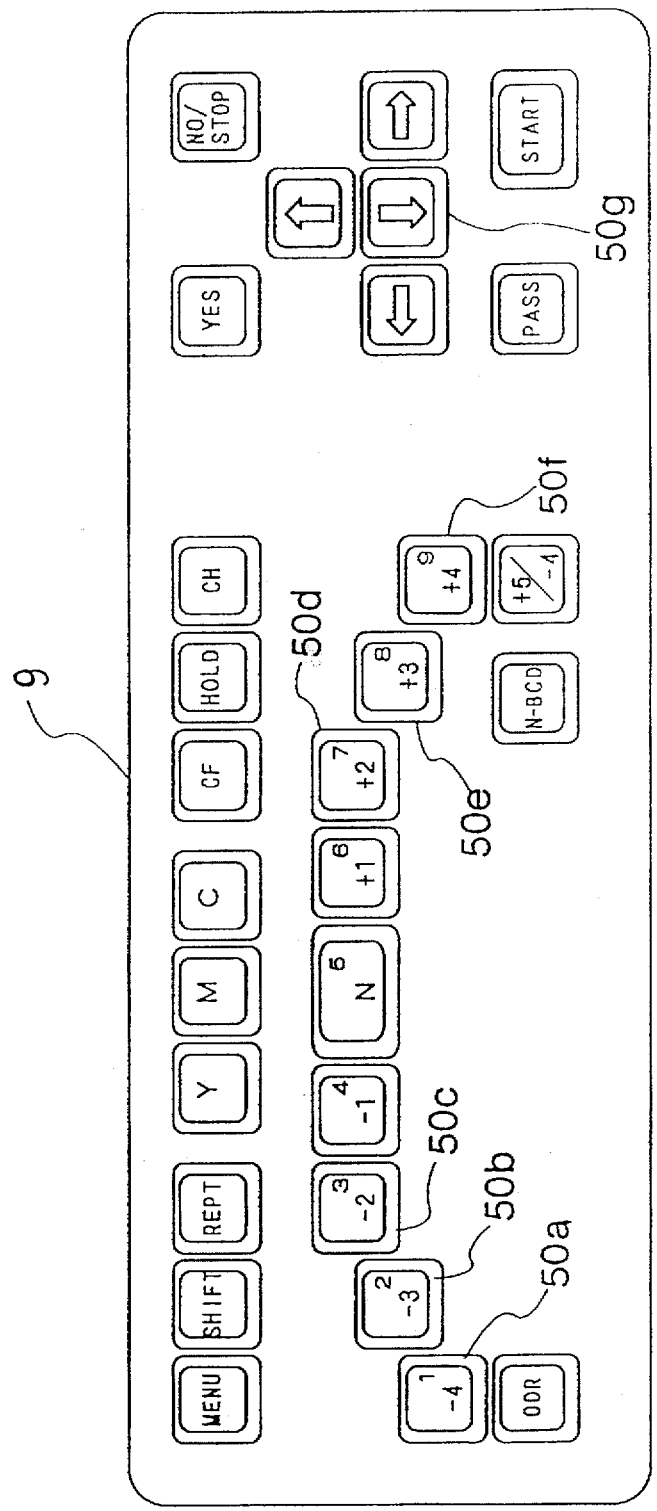
FIG. 7 is a plan view of a control panel.

The image frame selecting apparatus 3 may be modified to include frame identification marks formed by pasting plates showing characters or signs such as "A", "B", "C" and so on, in place of the input keys 33 and auxiliary input keys 34. Then, the control panel 9 also includes keys having the same characters or signs such as "A", "B", "C" and so on. When the key "A" on the control panel 9 is pressed, an image frame disposed in the area 31a corresponding to the frame identification marking "A" is selected for printing. For inputting exposure conditions and the like, the control panel 9 usually has a key arrangement as shown in FIG. 7 or a similar arrangement. New keys having the characters or signs such as "A", "B", "C" and so on as described above need not be provided for the control panel 9, but the keys included as intrinsic parts thereof may be utilized for the above purpose.

Figure 8:
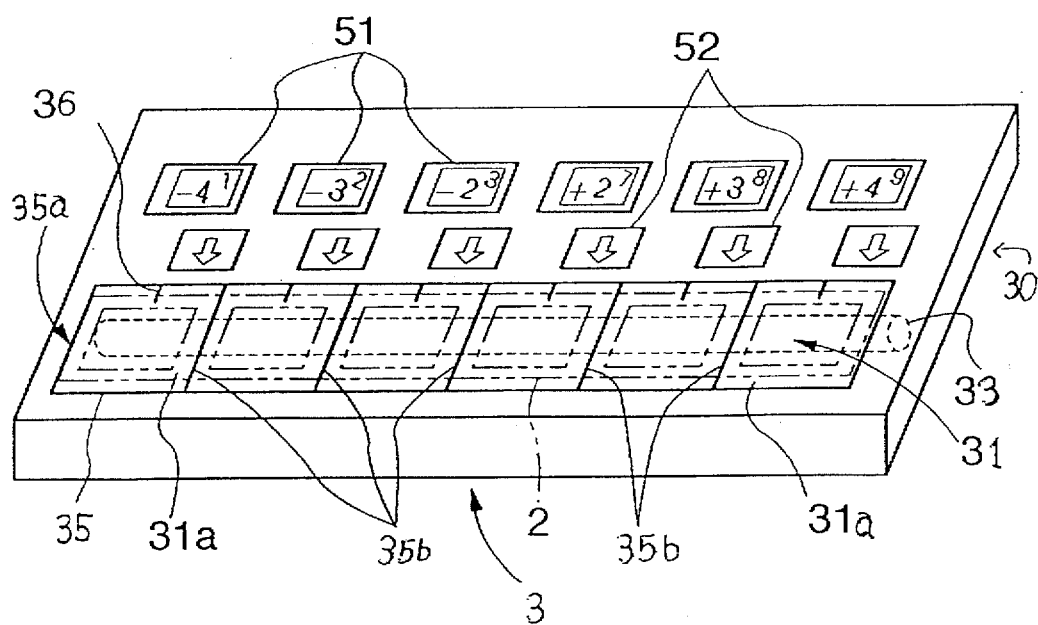
FIG. 8 is a perspective view of an image frame selecting apparatus in another embodiment of the invention.

For example, keys showing degrees of density correction such as a "−4" key 50a, a "−3" key 50b, a "−2" key 50c, a "+2" key 50d, a "+3" key 50e and a "+4" key 50f, and a down arrow key 50g for moving the cursor, may be used as a switching device for identifying the frames. For this purpose, as shown in FIG. 8, plates 51 showing characters or signs such as "−4", "−3", "−2", "+2", "+3" and "+4", and auxiliary plates 52 each showing a down arrow sign, may be arranged in the order of the above-mentioned keys and adjacent the areas 31a of the image frame selecting apparatus 3. These plates may be pasted in the positions of the input keys 33 and auxiliary input keys 34 in the foregoing embodiment, to be used as markings corresponding to the respective areas 31a.

A key operation for selecting image frames for printing according to the construction shown in FIG. 8 will be described now. For designating a full-size frame, the operator presses one of the keys, i.e. "−4" key 50a, "−3" key 50b, "−2" key 50c, "+2" key 50d, "+3" key 50e and "+4" key 50f, which has the same character or sign as the plate 51 corresponding to the image frame to be printed.

In the case of half-size frames, two frames arranged sideways correspond to one plate 51. For designating the left one of these half-size frames, the operator presses only one of the keys, i.e. "−4" key 50a, "−3" key 50b, "−2" key 50c, "+2" key 50d, "+3" key 50e or "+4" key 5f, which has the same character or sign as the plate 51 corresponding to the image frame to be printed. For designating the right one of the two half-size frames, the operator presses the down arrow key 50g corresponding to the auxiliary plates 52 while pressing one of the keys, i.e. "-4" key 50a, "-3" key 50b, "-2" key 50c, "+2" key 50d, "+3" key 50e or "+4" key 50f, which has the same character or sign as the plate 51 corresponding to the image frame to be printed.

In this case, it is not absolutely necessary for the film receiving unit 30, which is the core element of the image frame selecting apparatus 3, to be connected to the controller 7. The film receiving unit 30 may be used as a freely movable film viewer provided independently of the photographic printer 1 having the controller 7.

Further, the switching function of the input keys 33 and auxiliary input keys 34 may be used as it is, by applying the above characters and signs of the plates 51 and auxiliary plates 52 to the input keys 33 and auxiliary input keys 34. Then, image frames to be printed may be designated both by operating the input keys 33 and auxiliary input keys 34 and by operating the "-4" key 50a, "-3" key 50b, "-2" key 50c, "+2" key 50d, "+3" key 50e, "+4" key 50f and down arrow key 50g on the control panel 9.

Frame identification markings in the form of LEDs, for example, may be provided in the positions of input keys 33 and auxiliary input keys 34, with the control panel 9 including a switch key for successively turning on the LEDs acting as the frame identification markings. Then, the switch key is operated to light one of the LED corresponding to a frame to be printed, and a separate, "enter" key is operated to establish this frame as a frame to be printed.

As a further modification, an input device may include transparent touch panels disposed on the film receiving surface 31, to hold the film 2 placed on the film receiving surface 31, and with switches formed in positions corresponding to the respective areas 31a. The operator may select an image frame on the film 2 for printing, by pressing one of the touch panels upon the area 31a corresponding to that image frame.

An image frame selected for printing may be trimmed or combined with other images. These processes will be described next.

To perform these additional processes, the image information of a selected image frame is displayed on the monitor 9, and the operator inputs, through the control panel 9, commands for the additional processes of the image displayed. Data for the additional processes are linked to the image information or to position data of the image information relative to the film 2. The additional processes include printing an image frame combined with other print information such as character information for postcards or calendars, and extracting part of an image from an entire image frame which is known as trimming. Finished states of these processes may also be displayed on the monitor 8.

For printing an image frame selected from the film 2 and combined with other print information on postcards or the like, the operator selects, through the control panel 9, what the client desires from print information stored in the control unit 100 in the form of composite image patterns including various character information or the like for particular applications. This selected information is displayed as a finished form on the monitor 8.

Figure 9:
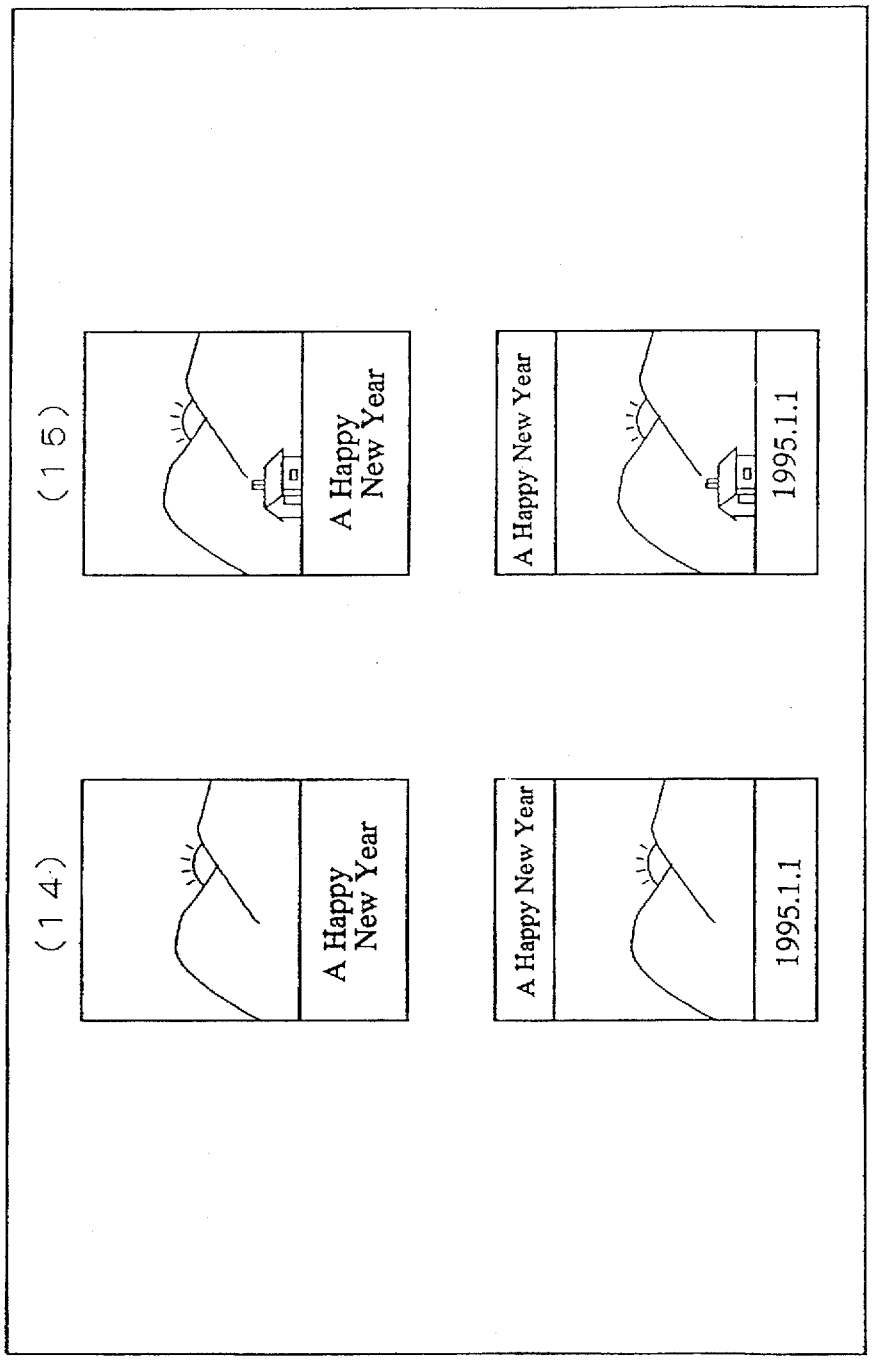
FIG. 9 is a view of images undergoing an additional process.

FIG. 9 shows examples of simulated images finished in two patterns as greeting cards, which are based on a 14th image frame and a 15th image frame selected from a photographic film 2. The composite patterns depicted in FIG. 9 include other print images (characters in the illustrated examples) arranged adjacent the images from the film 2. It is of course possible to superpose the other print images on the images from the film 2. The operator asks the client to look at the displayed pictures and indicate whether he or she is satisfied with the finishes. Then, the operator links the position data of an image frame the client has selected for actual printing, and additional data such as the number of prints and the type of particular finishing process, and stores these data in the external storage device 107. The position data of an image frame here comprises a place of that image frame in the order counted from the leading end of film 2.

For performing trimming as a particular finishing process, though not shown in the drawings, the image in a selected image frame is shown in enlargement on the monitor 8, along with a frame indicating a range to be printed in superposition on the displayed image. The size and position in the image of this frame are variable, as desired, on instructions inputted through the control panel 9. The operator asks the client to instruct and confirm a trimming range, links the position data of a selected image frame and additional data such as the trimming range, and stores these data in the external storage device 107. It is of course possible to perform the image combining process and trimming process for the same image.

For selecting image frames for the additional processes, it is possible to use touch panels or other pointing devices provided for the monitor 8 displaying scanned images of the image frames on the film 2.

Other print information to be combined with the images of the image frame on the film 2 are not limited to the information stored in patterns in the control unit 100. This information may include print information such as characters and images prepared and brought in by clients, which are inputted from the external storage device 107, for example.

The external storage device is described as a medium for exchanging various data with clients. However, it is possible to employ data communication through communication circuits or the like.

It is also advantageous to use mark sheets for data communication with clients. A method of using mark sheets will be described hereinafter, taking an order card with a mark sheet portion as shown in FIG. 10 for example.

When a client orders additional prints, he or she looks at prints and film 2, and sometimes index prints as well, selects a desired frame or frames, and fills in an applicable portion of a marking region 61 in an order card 60. The order card 60 also includes a name column to be filled with the client's name and telephone number.

When the client desires three prints of frame No. 3 and two prints of frame No. 11, the client blacks out numeral "3" opposite frame No. 3 and numeral "2" opposite frame No. 11 with a pencil or marker as shown in FIG. 10. It is also possible to indicate, for example, eight prints by blacking out numerals "5" and "3".

The order card may include a marking region for designating finished conditions (e.g. size, lustrous, lusterless, framed, frameless).

Further, memos may be written to indicate special processing conditions such as exposure conditions used in simultaneous printing.

When additional prints are ordered with the order card 60 having appropriate columns blacked out, along with the film 2, the order card 60 is set to a card reader/writer 108 connected to the controller 7 and having a mark reading section and a magnetic data read/write section. The card reader/writer 108 draws in the order card 60, with the mark reading section and magnetic data read/write section scanning the marking area 61 and magnetic recording area 62 of the order card 60. Consequently, the blacked mark positions and magnetic data are read and outputted to the control unit 100. At this time, the marks and magnetic data are outputted in relation to timing pulses obtained by detection of timing marks 63 formed along an edge of the order card 60. The timing marks 63 may be magnetic, optical or mechanical marks.

The controller 7 determines the numbers of prints for the respective frames on one film from the data showing the mark positions and the timing pulses, and stores numbers of prints information in internal memory. The controller 7 also determines processing conditions such as exposure conditions from the magnetic data, and stores these conditions in the internal memory as printing condition information.

The operator takes all film pieces from film sleeves, and sets them to the printer 1. Frame numbers are read from film 2 set to the printer 1, based on frame identification information in the form of bar codes or the like affixed to the respective frames. Only the images of the designated frame numbers are printed in the designated numbers on printing paper by referring to the numbers of prints information stored in the internal memory. The printing paper is then cut and discharged. During this operation, the images of the designated frame numbers may be scanned and displayed once on the monitor 8 for confirmation purposes. Then, an exposing operation may be started by pressing a start key on the control panel 9.

The processing conditions such as exposure conditions are determined with reference to the numbers of prints information stored in the internal memory. If memos or the like indicating special conditions are present on the order card 60, the operator reads the memos and sets these conditions through the control panel 9.

The order card 60 remains in the card reader/writer 108 until all the film pieces containing the frames designated on the order card 60 have been set to complete the printing process. This avoids part of the film pieces being left unprocessed.

After all the designated frames are printed, the order card 60 is automatically ejected from the card reader/writer 108, and the film 2 is also discharged.

The film 2 is placed in a negative sheet and handed to the client along with the order card 60 and prints of the images. At this time, a different order card to which only the magnetic data are copied may be given to the client to be used for any further prints to be made. It is also possible to eject the order card 60 forcibly from the card reader/writer 108 in the course of a printing process. The processing conditions include, besides exposure conditions such as print data, other conditions necessary for printing and developing frame images on printing paper. All or part of such processing conditions are recorded on the order card.

In this way, printing is carried out automatically based on the designated numbers of prints and finishing conditions designated on the order card 60. This feature promotes printing efficiency, and enables a reliable printing process. In addition, the printing process is executed based on processing conditions read from the order card 60 which may include corrections made to the exposure conditions in time of simultaneous printing. Consequently, prints of the same quality as in simultaneous printing may be obtained to the client's satisfaction.

As noted above, when all the pieces of film 2 in a negative sheet are handed to the client along with the order card 60 and prints of the images, a different order card to which only the magnetic data are copied may be given to the client to be used for any further prints to be made.

The new order card has, automatically recorded thereon, corrected processing conditions such as exposure conditions for each image frame on the developed film. Thus, by using this card when printing images of the film at a later time, there will be no need to determine processing conditions such as exposure condition all over again. This feature provides the effects of promoting the efficiency of additional printing, and enabling a printing operation to be repeated with the same conditions. Thus, use of such photographic processing apparatus provides prints that meet clients' satisfaction. Further, by printing images after reading predetermined processing conditions and the selected numbers of prints to be made of selected image frames from an order card, manual errors are avoided, and prints are prepared accurately and efficiently. Since printing is based on recorded processing conditions, prints may be made with the same conditions over and over again to satisfy clients.

What is claimed is:

1. An image frame selecting apparatus for a photographic printer comprising:

a film receiving unit defining a receiving surface for receiving a photographic film having a plurality of image frames, said receiving surface being divided into a plurality of areas corresponding to said image frames;

a positioning indicator provided for said film receiving unit for positioning said photographic film on said receiving surface; and image frame selecting means for selecting an image frame to be printed from said photographic film by designating at least one of said areas; and wherein said image frame selecting means includes markings formed in relation to said areas of said receiving surface, respectively, and an input device operable to select an image frame to be printed.

2. An image frame selecting apparatus as defined in claim 1, wherein said input device includes a plurality of input switches arranged in relation to said markings, respectively, each of said markings and a corresponding one of said input switches having the same character or sign to establish a one-to-one relationship therebetween.

3. An image frame selecting apparatus as defined in claim 1, wherein said input device is disposed adjacent said receiving surface.

4. An image frame selecting apparatus as defined in claim 1, wherein said input device is disposed remote from said film receiving unit.

5. An image frame selecting apparatus for a photographic printer comprising:

a film receiving unit defining a receiving surface for receiving a photographic film having a plurality of image frames, said receiving surface being divided into a plurality of areas corresponding to said image frames;

a positioning indicator provided for said film receiving unit for positioning said photographic film on said receiving surface; and image frame selecting means for selecting an image frame to be printed from said photographic film by designating at least one of said areas; and wherein said receiving surface includes frame boundary indicators corresponding to boundaries between said image frames on said photographic film set to said positioning indicator.

6. An image frame selecting apparatus as defined in claim 1 wherein said film receiving unit includes lighting means for lighting said photographic film placed thereon.

7. An image frame selecting apparatus as defined in claim 1, wherein said input device is operable to transmit a signal relating to the number of prints made of said image frame selected.

8. An image frame selecting system for a photographic printer comprising:

a film receiving unit defining a receiving surface for receiving a photographic film having a plurality of image frames, said receiving surface being divided into plurality of areas corresponding to said image frames;

a positioning indicator provided for said film receiving unit for positioning said photographic film on said receiving surface;

image frame selecting means for selecting an image frame to be printed from said photographic film by designating at least one of said areas;

image reading means for reading said image frames from said photographic film;

storage means for storing image information of said image frames read;

image processing means for generating positive images of said image frames based on said image information stored in said storage means;

a monitor for displaying said positive images of said image frames; and control means for generating position data relative to said photographic film of said image frame selected by said image frame selecting means; and wherein said control means is operable to link additional data to said position data and an image frame determined by said position data.

9. An image frame selecting system as defined in claim 8, wherein said position data and said additional data linked thereto are stored in a storage medium.

10. An image frame selecting system as defined in claim 8, wherein an image of said image frame processed based on said additional data is displayed on said monitor.

11. An image frame selecting system as defined in claim 8, wherein, when a plurality of additional data of the same type are linked to said position data, a plurality of images of image frames processed based on said plurality of additional data are displayed on said monitor.

12. An image frame selecting system as defined in claim 8, wherein said additional data includes trimming information.

13. An image frame selecting system as defined in claim 8, wherein said additional data includes composite image information to be combined with said image frame.

14. An image frame selecting system as defined in claim 8, wherein said additional data includes number of prints information.

15. An image frame selecting system for a photographic printer comprising:

a film receiving unit defining a receiving surface for receiving a photographic film having a plurality of image frames, said receiving surface being divided into a plurality of areas corresponding to said image frames;

a positioning indicator provided for said film receiving unit for positioning said photographic film on said receiving surface;

image frame selecting means for selecting an image frame to be printed from said photographic film by designating at least one of said areas;

image reading means for reading said image frames from said photographic film;

storage means for storing image information of said image frames read;

image processing means for generating positive images of said image frames based on said image information stored in said storage means;

a monitor for displaying said positive images of said image frames; and control means for generating position data relative to said photographic film of said image frame selected by said image frame selecting means, and wherein said position data is a place of a selected image frame in an order counted from an image frame at a leading end of said photographic film.

16. An image frame selecting system for a photographic printer comprising:

image frame selecting means for selecting at least one image frame to be printed from a photographic film having a plurality of image frames;

image reading means for reading said image frames from said photographic film;

storage means for storing image information of said image frames read;

image processing means for generating positive images of said image frames based on said image information stored in said storage means;

a monitor for displaying said positive images of said image frames; and control means for generating position data relative to said photographic film of said image frame selected by said image frame selecting means, linking additional data to said position data and an image frame determined by said position data, and storing said position data and said additional data linked thereto in a storage medium; and wherein an image of said image frame processed based on said additional data is displayed on said monitor.

17. An image frame selecting system as defined in claim 16, wherein said additional data includes trimming information.

* * * * *